United States Patent [19]

Shulik et al.

[11] Patent Number: 4,759,866

[45] Date of Patent: Jul. 26, 1988

[54] PRIMARY HINDERED AMINOACIDS FOR PROMOTED ACID GAS SCRUBBING PROCESS

[75] Inventors: Larry J. Shulik, Somerville; Guido Sartori; W. S. W. Ho, both of Annandale; Warren Thaler, Flemington; George E. Milliman, Fanwood, all of N.J.

[73] Assignee: Exxon Research and Engineering Company, Florham Park, N.J.

[21] Appl. No.: 93,734

[22] Filed: Sep. 8, 1987

Related U.S. Application Data

[63] Continuation of Ser. No. 852,322, Apr. 15, 1986, abandoned.

[51] Int. Cl.$^4$ ............................................. C09K 3/00
[52] U.S. Cl. .................................................. 252/192
[58] Field of Search ........................................ 252/192

[56] References Cited

U.S. PATENT DOCUMENTS

| | | | |
|---|---|---|---|
| 4,217,238 | 8/1980 | Sartori et al. | 252/192 |
| 4,376,101 | 3/1983 | Sartori et al. | 252/192 X |
| 4,376,102 | 3/1983 | Thaler et al. | 252/192 X |
| 4,405,577 | 9/1983 | Sartori et al. | 252/192 X |
| 4,537,752 | 8/1985 | Weber | 252/192 X |

Primary Examiner—Matthew A. Thexton
Attorney, Agent, or Firm—Ronald D. Hantman

[57] ABSTRACT

Disclosed are primary sterically hindered aminoacids for use as promoters for alkali metal salts in acid gas scrubbing. The primary sterically hindered aminoacid is selected from 1-amino-cyclopentane carboxylic acid and those represented by the formula:

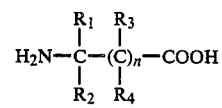

where $R_1$ and $R_2$ are independently selected from $CH_3$, $C_2H_5$, and $C_3H_7$; $R_3$ and $R_4$ are independently selected from hydrogen and $CH_3$: and n is 0, 2, or 3.

13 Claims, 1 Drawing Sheet

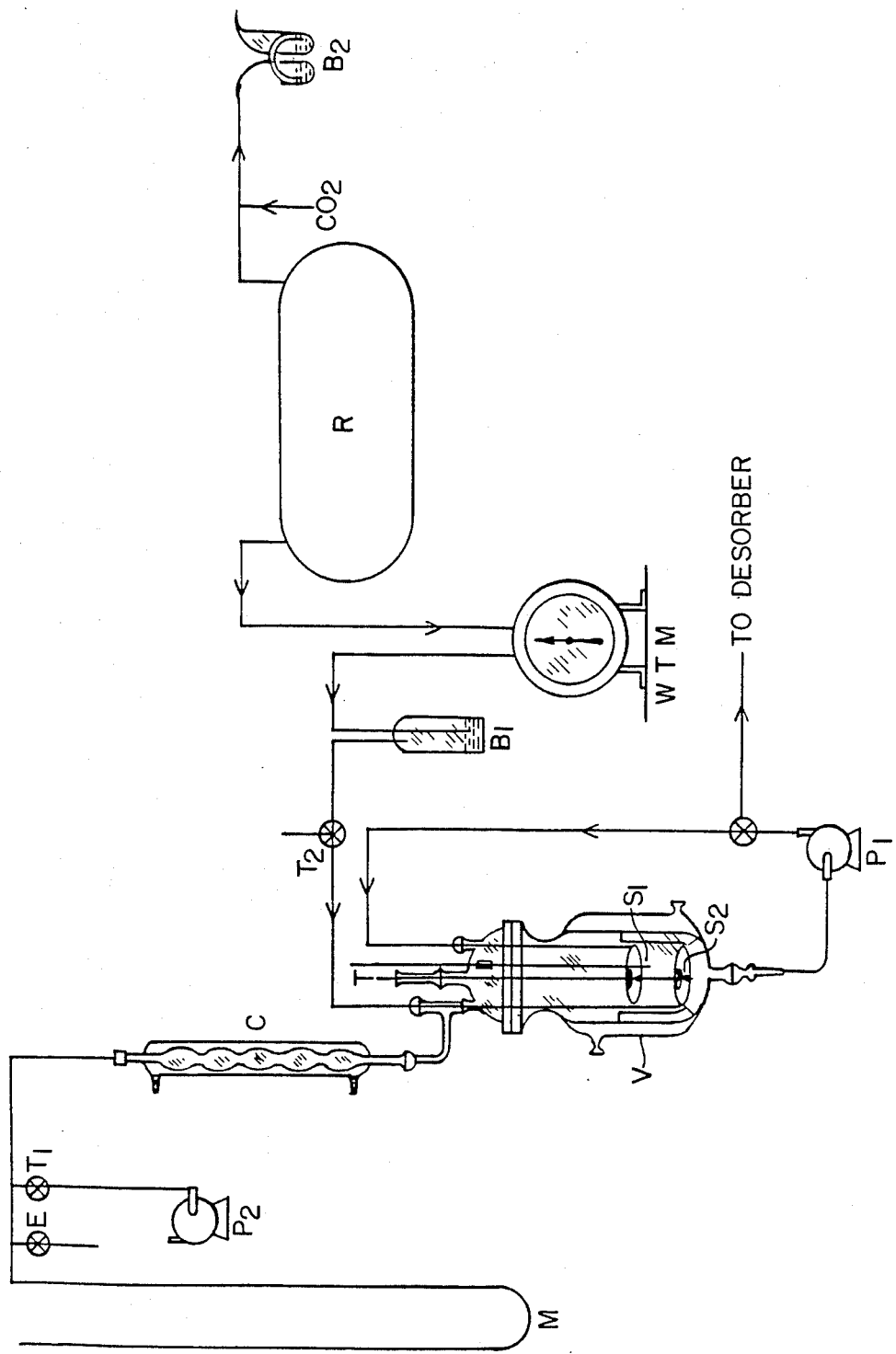

PRIMARY HINDERED AMINOACIDS FOR PROMOTED ACID GAS SCRUBBING PROCESS

FIELD OF THE INVENTION

This is a continuation of application Ser. No. 852,322, filed Apr. 15, 1986, now abandoned.

The present invention relates to the use of primary hindered aminoacids, such as 2-amino isobutyric acid, as promoters for alkali metal salts in acid gas scrubbing.

BACKGROUND OF THE INVENTION

The treatment of gaseous streams for removal of acid gases, such a hydrogen sulfide and carbon dioxide, is an essential processing step in petroleum refining, natural gas production, and the petrochemical industry. Myriad technologies have achieved commercial status, each satisfying for a particular set of circumstances a required balance among operability, process requirements, flexibility, and economic factors.

Such processes include the use of physical solvents, aqueous solutions of chemical agents (amines, carbonates, redox systems), solvent/chemical mixtures, and solid adsorbents, etc.

Historically, gas treating problems have been of three main types—hydrogen sulfide removal, the simultaneous removal of hydrogen sulfide and carbon dioxide, and carbon dioxide removal with little or no hydrogen sulfide present. The present inventio pertains to the removal of acid gases, particularly to carbon dioxide, from gaseous streams containing little or no sulfur gases, such as in gaseous streams used in the manufacture of hydrogen and ammonia.

One leading type of process for the removal of $CO_2$ from gaseous streams containing little or no sulfur gases, success is the so-called "hot pot" process. The hot pot process is based on the use of a hot aqueous potassium carbonate solution to convert the $CO_2$ to potassium bicarbonate. An activator, or promoter, is usually used to improve the absorption rate and/or capacity of the solution and a $V^{+5}$ salt is often used as a corrosion inhibitor. Non-limiting examples of promoters used in the hot pot process include alkanolamines, particularly diethanolamine (DEA), sterically hindered polyamines, such as N-cyclohexyl 1,3-propane-diamine (CHPD) and sterically hindered amino acids such as N-secondary butyl glycine (SBG). While all of these promoters have met with varying degrees of commercial success, they are all faced with shortcomings. For example, DEA has a relatively low absorption rate and capacity and is not very stable. CHPD requires a cosolvent and undergoes degradative reactions, and SBG undergoes oxidative degradation in the presence of vanadium.

Consequently, there exists a need in the art for promoters for hot pot processes which not only have relatively high absorption rates and working capacities, but which are not susceptible to degradation under process conditions or in the presence of vanadate corrosion inhibitors.

SUMMARY OF THE INVENTION

In accordance with the present invention there is provided an aqueous gas scrubbing composition comprising:
(a) one or more alkali metal salts; and
(b) one or more primary sterically hindered aminoacids represented by formula:

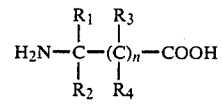

where $R_1$ and $R_2$ are independently selected from $CH_3$, $C_2H_5$, and $C_3H_7$; $R_3$ and $R_4$ are independently hydrogen and $CH_3$; and n is 0, 2, or 3.

Preferably, $R_1$ and $R_2$ are chosen independently from $CH_3$ and $C_2H_5$, more preferably $R_1$ and $R_2$ are $CH_3$ and $n=0$.

In another embodiment, the amino acid is 1-amino-cyclopentane carboxylic acid. In yet another preferred embodiment of the present invention, the aqueous gas scrubbing solution is comprised of about 15 to 30 wt.% of potassium carbonate, about 2 to 15 wt.% of sterically hindered primary amino acid, and an effective amount of a vanadium compound to provide corrosion protection, the balance being water.

Also in accordance with the present invention is a process for the removal of $CO_2$ from a gaseous stream containing $CO_2$ which comprises contacting the stream in an absorption step with an aqueous absorbing solution comprising (a) a potassium salt, and (b) a primary sterically hindered amino acid represented by the above mentioned formula or 1-amino-cyclopentane carboxylic acid.

Absorbed $CO_2$ is then desorbed in a regeneration step, and the regenerated solution can be recycled to the absorber.

In a more preferred embodiment, the solution also contains an effective amount of a vanadium corrosion inhibitor. That is, at least that amount which will result in the inhibition of corrosion of the metal of the process unit apparatus. Vanadium slats can be used at a concentration of about 0.001 to 10 wt.% based on vanadium metal, preferably about 0.1 to 5 wt.%, more preferably from about 0.1 to 1 wt.%.

BRIEF DESCRIPTION OF THE DRAWINGS

The sole FIGURE hereof is a diagrammatic flow sheet illustrating an experimental reaction apparatus for removing carbon dioxide from gas streams.

DETAILED DESCRIPTION OF THE INVENTION

The term, acid gas, includes $CO_2$ alone or in combination with $H_2S$, $SO_2$, $SO_3$, $CS_2$, HCN, COS and the oxides and sulfur derivatives of $C_1$ to $C_4$ hydrocarbons. These acid gases may b epresent in trace amounts within a gaseous mixture or in major proportions.

The above acids are removed from gaseous streams by use of one of more alkali metals salts (which include hydroxides), and one or more primary sterically hindered amino acids. The primary sterically hindered amino acid can be 1-amino-cyclopentane carboxylic acid or can be an amino acid represented by the formula:

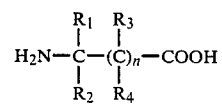

where $R_1$ and $R_2$ are independently selected from $CH_3$, $C_2H_5$, and $C_3H_7$; $R_3$ and $R_4$ are independently hydrogen and CH₃; and n is 0, 2, or 3. Preferably $R_1$ and $R_2$ are chosen independently from $CH_3$ and $C_2H_5$, more preferred is when both $R_1$ and $R_2$ are $CH_3$ and n is 0. It is noted that n cannot be 1 becasue beta amino acids in aqueous mediums undergo deamination, whereas alpha and gamma amino acids do not.

Potassium is the preferred alkali metal for use in the absorbent solutions of the present invention. Although other potassium salts of weak acids may be used, potassium carbonate, potassium hydroxide, potassium borate, and their mixtures, are preferred. It is understood herein that the term alkali metal salts also includes alkali metal hydroxides.

Vanadium corrosion inhibitors suitable for use herein are those vanadium compounds which contain vanadium at an oxidation state of +5 or which can undergo oxidation to result in vanadium being at an oxidation state of +5. The preferred $V^{+5}$ compound is $V_2O_5$. Preferred vanadium slats which can result in $V^{+5}$ compositions upon oxidation include the alkali metal vanadates.

The contacting of the absorbent mixture and the acid gas may take place in one or more suitable contacting vapor/liquid zones. In such processes, the gaseous mixture from which the acid gases are to be removed may be brought into intimate contact with the absorbing solution using conventional means, such as a tower packed with, for example, metallic or ceramic rings or with bubble cap plates or sieve plates, or a bubble reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to 200° C., more preferably from about 50° to 150° C. Pressures in the absorber may vary widely; acceptable pressures are between about 5 and 2000 psia, preferably about 100 to 1500 psia, and most preferably about 200 to 1000 psia. In the desorber, the pressures may range from about 5 to 100 psia. The partial pressure of the acid gas, e.g., $CO_2$, in the feed mixture will preferably be in the range from about 0.1 to about 800 psia, and more preferably in the range from about 1 to about 400 psia. Absorption takes place under conditions such that the acid gas, e.g., $CO_2$, is absorbed by the absorption solution. Generally, countercurrent contacting to remove the acid gas will last for a period from about 0.1 to 60 minutes, preferably about 1 to 10 minutes. During absorption, the solution is maintained in a single phase.

The aqueous absorption solution comprising the alkaline material, the activator system comprising the primary sterically hindered amino acid, which is saturated or partially saturated with gases, such as $CO_2$, may be regenerated so that it can be recycled back to the absorber. Preferably, the regeneration should take place in a single liquid phase. Therefore, the presence of the highly water soluble amino acid provides an advantage in this part of the overall acid gas scrubbing process. The regeneration, or desorption, may be accomplished in one or more vapor/liquid contacting stages and is performed by conventional means, such as pressure reduction, which causes the acid gases to flash off and by-passing the solution into a tower of similar construction to that used in the absorption step, at or near the top of the tower, and passing an inert gas, such as air, nitrogen, or preferably steam, up the tower. The temperature of the solution during the regeneration step may be the same as in the absorption step, i.e., about 25° to 200° C., and preferably about 50° to 150° C. The absorbing solution, after being cleansed of at least a portion of the acid moieties, may be recycled back to the absorbing tower. Makeup absorbent may be added as needed.

As a typical example, during desorption, the acid gas, e.g., $CO_2$-rich solution from the high pressure absorber, is first sent to a flash chamber where steam and some $CO_2$ are flashed from the solution at low pressure. The amount of $CO_2$ flashed off will, in general, be about 20 to 60% of the net $CO_2$ recovered in the flash and stripper. This is increased somewhat, e.g., to about 50 to 80%, with the high desorption rate promoter system of this invention owing to the enhanced $CO_2$ loading of the rich solution. Solution from the flash chamber is then steam striped in the packed or plate tower, stripping steam having been generated in the reboiler in the base of the stripper. Pressure in the flash chamber and stripper is usually about 16 to 100 psia, preferably about 16 to 30 psia, and the temperature is in the range from about 25° to 200° C., preferably about 35° to 150° C., and more preferably about 100° to 140° C. Stripper and flash temperatures will, of course, depend on stripper pressure, thus at about 16 to 25 psia stripper pressures, the temperature will preferably be about 100° to 140° C. during desorption.

In the most preferred embodiment of the present invention, the acid gas, e.g., $CO_2$, is removed from a gaseous stream by means of a process which comprises, in sequential steps, (1) contacting the gaseous stream with a solution comprising about 10 to 40 weight percent, preferably about 15 to 30 weight percent of potassium carbonate, an activator or promoter system comprising about 2 to 20 weight percent, preferably about 2 to 15 weight percent, more preferably about 2 to 10 weight percent of the sterically hindered primary amino acid, the balance of the solution being comprised of water, the contacting being conducted at conditions whereby the acid gas is absorbed in the solution, and preferably at a temperature ranging from about 25° to 200° C., more preferably from about 50° to 150° C. and a pressure ranging from about 100 to 1500 psia, and (2) regenerating the solution at conditions whereby the acid gas is desorbed from the solution. By practicing the present invention, one can operate the above described process at conditions whereby the working capacity, which is the difference in moles of acid gas abosrbed in the solution at the termination of steps (1) and (2), based on the moles of potassium carbonate originally present, is greater than obtained under the same operating conditions for removing acid gases from gaseous streams, wherein said same operating conditions include conventional promoters such as DEA. In other words, working capacity is defined as follows:

$CO_2$ in solution at completion of absorption less $CO_2$ in solution at completion of desorption which is:

$$\frac{\text{Moles of } CO_2 \text{ Absorbed}}{\text{Initial Moles } K_2CO_3} \text{ less } \frac{\text{Moles Residual } CO_2 \text{ Absorbed}}{\text{Initial Moles } K_2CO_3}$$

It should be noted that throughout the specification where working capacity is referred to, the term may be defined as the difference between $CO_2$ loading in solution at absorption conditions (step 1) and the $CO_2$ loading in solution at regeneration conditions (step 2), each divided by the initial moles of potassium carbonate. The working capacity is equivalent to the thermodynamic cyclic capacity, that is, the loading is measured at equilibrium conditions. This working capacity may be obtained from the vapor-liquid equilibrium isotherm, that is, from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$ absorption pressure, (2) acid gas, e.g., $CO_2$ regeneration pressure, (3) temperature of absorption, (4) temperature of regeneration, (5) solution composition, that is, weight percent of aminoacid and the weight percent of the alkali metal salt or hydroxide, for example potassium carbonate, and (6) gas composition.

The skilled artisan may conveniently demonstrate the improved instant process which results by use of the sterically hindered primary aminoacid of the instant invention by a comparison directly with a process wherein the sterically hindered primary aminoacids are not included in the aqueous absorption solution composition, (at similar pressure and temperature conditions). When the sterically hindered primary aminoacids of the present invention are utilized, the difference between the amount of acid gas, e.g., $CO_2$ absorbed at the end of step 1 (absorption step) defined above, and step 2 (desorption step) defined above, is significantly greater than with conventional promoters such as DEA. It has been found that the use of the sterically hindered primary aminoacids of the present invention provide a working capacity which is at least 15% greater than the working capacity of commercial promoters, such as diethanolamine (DEA). Working capacity increases of about 20 to 60% may be obtained by use of the sterically hindered primary aminoacids compared to DEA.

Besides increasing working capacity, the use of aminoacids of the present invention leads to higher rates of absorption and desorption. Rate of absorption is defined as the amount of $CO_2$ absorbed in a fixed time period. The combined higher rate and capacity leads to a lower steam consumption during desorption.

Steam requirements are the major part of the energy cost of operating an acid gas, e.g., $CO_2$ absorption unit. Substantial reduction in energy, i.e., operating costs, will be obtained by the use of the process utilizing the aminoacids of the present invention. Additional savings from new plant investment reduction and debottlenecking of existing plants may also be obtained by the use of the aminoacids of the present invention. The removal of acid gases, such as $CO_2$, from gas mixtures is of major industrial importance, particularly in systems which utilize potassium carbonate activated by the aminoacids of the present invention.

While sterically hindered amines, as shown in U.S. Pat. No. 4,112,050, provide unique benefits in their ability to improve the working capacity in the acid absorbing, or scrubbing process, their efficiency decreases in alkaline "hot pot"(hot potassium carbonate) scrubbing systems at high temperatures and at low concentrations of the acid gas owing to phase separation. Therefore, full advantage of the highly effective sterically hindered amines cannot always be utilized at these operating conditions. The addition of an aminoacid, as a cosolvent and copromoter, as shown in U.S. Pat. No. 4,094,957, solves the problem of phase separation and enables a more complete utilization of sterically hindered amines as the alkaline materials activator or promoter. Many of the aminoacids disclosed in that patent, while soluble in these alkaline systems, when used, alone, are not as effective as activators in acid gas scrubbing processes as the other sterically hindered amines, or are incompatible with vanadium corrosion inhibitors. Therefore, it was not expected that the sterically hindered primary aminoacids of the present invention, as the sole promoter, would provide high working capacity, high rates of $CO_2$ absorption, and stability at process temperatures in the presence of $V^{+5}$ salts.

The primary hindered aminoacids of this invention have been surprisingly found to be very stable to chemical oxidation by vanadium +5 corrosion inhibitor, and also to provide excellent absorption rates of carbon dioxide, when used in the aqueous acid gas scrubbing compositions of this invention. More particularly, the primary hindered aminoacids of this invention had been found to undergo no substantial chemical oxidation in the presence of such vanadium +5 corrosion inhibitor over extensive time periods at elevated temperatures, and in particular, according to NMR analysis, at least about 95%, and more preferably at least about 98%, of the amount of vanadium +5 corrosion inhibitor charged to an aqueous acid gas scrubbing composition of this invention will remian in the +5 oxidation state after at least 7 days, and preferably at least 30 days, at 100° C. when tests are conducted in sealed glass tubes.

The absorbing solution of the present invention, as described above, is comprised of a major proportion of two materials, e.g., alkali metal salts or hydroxides, and a minor proportion of the sterically hindered primary aminoacid activator system. The remainder of the solution is comprised of water and/or other commonly used additives, such as anti-foaming agents, corrosion inhibitors, etc.

The following invention is illustrated further by the following examples which, however, are not to be taken as limiting in any respect. All parts and percentages, unless expressly stated to be otherwise, are by weight.

EXAMPLE 1 (COMPARATIVE)

The experimental reaction apparatus used in shown in FIG. 1. It is a reaction vessel V having a capacity of about 2.5 liters and a diameter of 10 cm, equipped with a heating jacket. The stirrer shaft carries two three-blade propellers, of which the upper one pushes the liquid downward and the lower one pushed the liquid upward. Pump $P_1$ removes liquid from the bottom of the reaction vessel and feeds it back to the gas-liquid interface through stainless steel sparger $S_1$. Vertical baffles further increase the contact between liquid and gas. Thermocouple T permits the reading of the temperature of the liquid. The top of a reflux condenser C is connected to a U-shaped, open ended manometer M. The apparatus cna be evacuated by means of pump $P_2$ through tap $T_1$. Nitrogen and $CO_2$ can be fed to the bottom of the reaction vessel through sparger $S_2$, using tap $T_2$; $CO_2$, coming from a cyclinder, goes first through the reservoir tank R acting as a ballast, then through a 3-liter wet test meter, then through bubbler $B_1$, where it is saturated with water. Hg-bubbler $B_2$ insures that no air is sucked into the reservoir tank R.

Constrictions such as narrow tubings and taps, have been carefully avoided in the $CO_2$ path. Tap $T_2$, which is the only one inserted in such a path, has a key with large holes (8 mm).

The following reagents, representative of a typical commercial gas-treating composition, were put into a 2-liter Erlenmeyer flask:
- 15g diethanolamine (DEA)
- 210g $K_2CO_3$
- 525g $H_2O$ When all was dissolved, the resulting solution was put into the absorber and brought to 80° C. The apparatus was closed and evacuated until the liquid began to boil. At this point, $CO_2$ was admitted until the solution was saturated with $CO_2$. The $CO_2$-rich solution was then transferred to the desorber for regeneration, in which it boiled for one hour to desorb $CO_2$.

The regenerated solution was transferred back to the absorber and cooled to 80° C. The apparatus was closed, and evacuated until thel iquid began to boil. At this poit, $CO_2$ was readmitted. As saturation, 23.6 liters of $CO_2$ was absorbed, 4 liters of which were absorbed in the first minute. The 23.6 liters of $CO_2$ is a measure of the cyclic capacity, whereas 4 liters in the first minute is a measure of the $CO_2$ absorption rate.

EXAMPLE 2 (COMPARATIVE)

The following solution was prepared:
- 42.8g glycine
- 497.2g water
- 210g $K_2CO_3$ The $CO_2$ absorption-desorption-reabsorption cycle was repeated as described in Example 1. 20.2 liters of $CO_2$ was reabsorbed, of which 4 liters was reabsorbed in the first minute. Glysine-promoted potassium carbonate solutions are used commercially for gas treating.

EXAMPLE 3

Example 1 was repeated, using a solution having the following composition:
- 75g 2-aminoisobutyric acid (AIBA)
- 210g $K_2CO_3$
- 465g $H_2O$ It was found that the regenerated solution reabsorbed 30 liters of $CO_2$, 8.6 liters of which was absorbed in the first minute.

This Example shows that a sterically hindered primary aminoacid, such as AIBA, has improved capacity and rate for $CO_2$ absorption, when compared to a commercial standard, such as DEA or glycine.

EXAMPLE 4

Example 1 was again repeated, this time using a solution having the following composition:
- 75g 2-amino-2-methyl butyric acid
- 210g $K_2CO_3$
- 465g $H_2O$ The $CO_2$ absorption-desorption-reabsorption cycle was repeated as described in Example 1. 26.8 liters of $CO_2$ was reabsorbed, of which 10.5 liters was reabsorbed in the first minute.

EXAMPLE 5

Again, Example 1 was followed, except the solution had the following composition:
- 75g 4-amino-4-methyl pentanoic acid
- 210g $K_2CO_3$
- 465g $H_2O$ The $CO_2$ absorption-desorption-reabsorption cycle was repeated as described in Example 1. 26.8 liters of $CO_2$ was absorbed, of which 9 was absorbed in the first minute.

EXAMPLE 6

Example 1 was repeated using a solution having the following composition:
- 52.5g AIBA
- 41.25g N-methyl-N-sec. butyl glycine (MSBG)
- 210g $K_2CO_3$
- 446.25g $H_2O$ The absorption-desorption-reabsorption cycle was repeated: 31.4 liters of $CO_2$ was reabsorbed, of which 10.5 liters were reabsorbed in the first minute.

While tertiary aminoacids such as MSBG are not very useful as promoters alone, they can provide some synergism when combined with aminoacids as promoters of the instant invention. They may also provide improvement in solubility of the aminoacid components. Furthermore, they are also compatible with $V^{+5}$ salts.

EXAMPLE 7

A total of about 3g of a mixture of the following ingredients was charged intoa pyrex tube:
- 0.15g AIBA
- 0.335g $K_2CO_3$
- 0.021g $V_2O_5$
- 0.73g $KHCO_3$
- 1.86g of $H_2O$ The tube was sealed and put into a metal heating block at 100° C. All solids dissolved. After three weeks, the yellow color of $V^{+5}$ was still present, indicating no degradation or reaction of AIBA with $V^{+5}$.

EXAMPLE 8 (COMPARATIVE)

Experiment 7 was repeated, replacing AIBA with the same amount of N-sec. butyl glycine. After 24 hours the solution was green, indicating formation of $V^{+4}$.

EXAMPLE 9

The following ingredients were charged into a pyrex tube:
- 0.15g 2-amino-2-methyl-butyric acid
- 0.021g $V_2O_5$
- 0.335g $K_2CO_3$
- 0.73g $KHCO_3$
- 1.86g $H_2O$ The tube was sealed and put into a metal heating block at 100° C. All solids dissolved. After 3 weeks the yellow color of $V^{+5}$ was still present, indicating no degradation or reaction of 2-amino-2-methyl-butyric acid with $V^{+5}$.

EXAMPLE 10 (COMPARATIVE)

The following ingredients were put into a pyrex tube:
- 0.149g glycine
- 0.022g $V_2O_5$
- 0.338g $K_2CO_3$
- 0.729g $KHCO_3$
- 1.772g $H_2O$ The tube was sealed and put into a metal heating block at 100° C. All solids dissolved. After 4 days the color of the solution had turned from yellow to green, indicating reduction of $V^{+5}$ by glycine.

EXAMPLE 11

A quantitative $V^{+5}$ stability test was conducted. Two NMR tubes were prepared with the same composition as in example 7, in which AIBA was used. One tube was kept at ambient temperature, and the other tube was heated in a metal block at 100° C. Periodically, the tube in the block was removed and $51_V$ NMR spectra (spectrometer probe temperature was 80° C.) were obtained with both this tube and the tube which remained at ambient temperature (control sample). Since $V^{4+}$ is paramagnetic, it gives no NMR signal. The NMR signal is therefore due only to $V^{5+}$ and can be used to measure the amount of $V^{5+}$ in the heated sample when the sample remaining at ambient temperature is used as a calibration sample.

The results were:

| Days at 100° C. | % $V^{5+}$ Remaining |
|---|---|
| 0 | 100 |
| 6 | 101 |
| 15 | 106 |
| 35 | 99 |

These results confirm the visual observations of Example 7, indicating no degradation or reaction of AIBA with $V^{5+}$.

EXAMPLE 12

According to the method of Example 1 (evaluating rate and capacity), and according to the method of Example 7 (evaluating stability to $V^{+5}$), samples of primary unhindered aminoacids (e.g., glycine), secondary unhindered aminoacids (e.g. N-n-butyl glycine), secondary moderately hindered aminoacids (e.g. N-sec. butyl glycine), secondary, severely hindered aminoacids (e.g. N-sec. butyl alanine) are compared in Table 1 below with primary sterically hindered aminoacids of the present invention.

TABLE 1

| Aminoacid Promoter | Rate[a] | Capacity[b] | Stability to $V^{+5c}$ |
|---|---|---|---|
| (DEA,standard) | — | — | + |
| Primary unhindered | — | — | — |
| Secondary unhindered | N.A. | N.A. | — |
| Secondary moderately hindered | + | + | — |
| Secondary severely hindered | — | + | + |
| Primary hindered | + | + | + |

[a]+, rate ≧ 8 liters in the first minute
[a]—, rate < 8 liters in the first minute
[b]+, capacity ≧ 26 liters total
[b]—, capacity < 26 liters total
[c]+, $V^{+5}$ stability ≧ 7 days with no loss of yellow color.
[c]—, $V^{+5}$ stability < 7 days with no loss of yellow color.
N.A. - not available.

Variations will be obvious to those skilled in the art, e.g. potassium, or other salts, of the aminoacids can be substituted for the aminoacids themselves. Also, various blends and mixtures of suitable aminoacids may be utilized instead of a single component. Aminoacid precursors, which upon hydrolysis yield the desired primary hindered aminoacids under the absorber-desorber process conditions are also suitable for use in the present invention.

It is noted that only the primary aminoacids of the present invention have all three of the above characteristics. That is, relatively high rates of absorption, working capacity, and stability in the presence of $V^{+5}$ salt.

What is claimed is:

1. An aqueous acid gas scrubbing composition comprising:
   (a) one or more alkali metal salts; and
   (b) as the sole sterically hindered amino compound acid gas absorption promoters, one or more primary sterically hindered aminoacids or their precursors by the formulas:

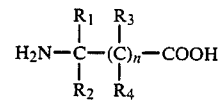

where $R_1$ and $R_2$ are independently selected from $CH_3$, $C_2H_5$, and $C_3H_7$; $R_3$ and $R_4$ are independently hydrogen and $CH_3$; and n is 0, 2, or 3.

2. The scrubbing composition of claim 1 containing from about 20 to 40 wt.% of said alkali metal salt and from about 2 to 15 wt.% fo said aminoacid, the balance being water.

3. The scrubbing composition of claim 2 wherein the alkali metal is potassium.

4. The scrubbing composition of claim 3 wherein $R_1$ and $R_2$ are methyl, and n is 0.

5. The scrubbing composition of claim 4 wherein potassium carbonate is the alkali metal salt.

6. The scrubbing composition of claim1 which also contains an effective amount of a $V^{+5}$ corrosion inhibitor.

7. The scrubbing composition of claim 5 which also contains an effective amount of a $V^{+5}$ salt.

8. An aqueous acid gas scrubbing solution comprising:
   (a) one or more alkali metal salts; and
   (b) as the sole sterically hindered amino compound acid gas absorption promoters, 1-amino-cyclopentane carboxylic acid or its percursor.

9. The scrubbing solution of claim 8 containing from about 10 to 40 wt.% of said alkali metal salt, and from about 2 to 15 wt.% of said 1-amino-cyclopentane carboxylic acid, the balance being water.

10. The scrubbing solution of claim 9 wherein the alkali metal is potassium.

11. The scrubbing solution of claim 10 wherein potassium carbonate is the alkali metal salt.

12. The scrubbing solution of claim 8 which also contains an effective amount of a $V^{+5}$ corrosion inhibitor.

13. The scrubbing solution of claim 11 which also contains an effective amount of a $V^{+5}$ corrosion inhibitor.

* * * * *